(12) United States Patent
Aldana et al.

(10) Patent No.: US 8,416,862 B2
(45) Date of Patent: Apr. 9, 2013

(54) EFFICIENT FEEDBACK OF CHANNEL INFORMATION IN A CLOSED LOOP BEAMFORMING WIRELESS COMMUNICATION SYSTEM

(75) Inventors: Carlos Aldana, San Francisco, CA (US); Joonsuk Kim, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 2247 days.

(21) Appl. No.: 11/237,341

(22) Filed: Sep. 28, 2005

(65) Prior Publication Data

US 2006/0239374 A1    Oct. 26, 2006

Related U.S. Application Data

(63) Continuation-in-part of application No. 11/168,793, filed on Jun. 28, 2005.

(60) Provisional application No. 60/673,451, filed on Apr. 21, 2005, provisional application No. 60/698,686, filed on Jul. 13, 2005.

(51) Int. Cl.
*H04K 1/10* (2006.01)
(52) U.S. Cl. .................. 375/260; 375/267; 375/350
(58) Field of Classification Search .................. 375/267
See application file for complete search history.

(56) References Cited

U.S. PATENT DOCUMENTS

| | | | | |
|---|---|---|---|---|
| 5,541,607 | A * | 7/1996 | Reinhardt | 342/372 |
| 2002/0187753 | A1 * | 12/2002 | Kim et al. | 455/69 |
| 2003/0139196 | A1 * | 7/2003 | Medvedev et al. | 455/522 |
| 2004/0042558 | A1 * | 3/2004 | Hwang et al. | 375/267 |
| 2005/0286663 | A1 * | 12/2005 | Poon | 375/347 |

OTHER PUBLICATIONS

A unified algebraic transformation approach for parallel recursive and adaptive filtering and SVD algorithms Jun Ma; Parhi, K.K.; Deprettere, E.F.; Signal Processing, IEEE Transactions on [see also Acoustics, Speech, and Signal Processing, IEEE Transactions on] vol. 49, Issue 2, Feb. 2001 pp. 424-437.*

* cited by examiner

*Primary Examiner* — Shuwang Liu
*Assistant Examiner* — Michael Neff
(74) *Attorney, Agent, or Firm* — Garlick & Markison; Holly L. Rudnick (57) ABSTRACT

A method for feeding back transmitter beamforming information from a receiving wireless communication device to a transmitting wireless communication device includes a receiving wireless communication device receiving a preamble sequence from the transmitting wireless device. The receiving wireless device estimates a channel response based upon the preamble sequence and then determines an estimated transmitter beamforming unitary matrix based upon the channel response and a receiver beamforming unitary matrix. The receiving wireless device then decomposes the estimated transmitter beamforming unitary matrix to produce the transmitter beamforming information and then wirelessly sends the transmitter beamforming information to the transmitting wireless device. The receiving wireless device may transform the estimated transmitter beamforming unitary matrix using a QR decomposition operation such as a Givens Rotation operation to produce the transformer beamforming information.

20 Claims, 8 Drawing Sheets

EFFICIENT FEEDBACK OF CHANNEL INFORMATION IN A CLOSED LOOP BEAMFORMING WIRELESS COMMUNICATION SYSTEM

CROSS REFERENCES TO RELATED APPLICATIONS

This application is a continuation-in-part of U.S. Utility application Ser. No. 11/168,793, filed Jun. 28, 2005 which claims priority to U.S. Provisional Patent Application Ser. No. 60/673,451, filed Apr. 21, 2005, and this application also claims priority to U.S. Provisional Patent Application Ser. No. 60/698,686, filed Jul. 13, 2005, all of which are incorporated herein by reference for all purposes.

BACKGROUND OF THE INVENTION

1. Technical Field of the Invention

This invention relates generally to wireless communication systems and more particularly to wireless communications using beamforming.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

In many systems, the transmitter will include one antenna for transmitting the RF signals, which are received by a single antenna, or multiple antennas, of a receiver. When the receiver includes two or more antennas, the receiver will select one of them to receive the incoming RF signals. In this instance, the wireless communication between the transmitter and receiver is a single-output-single-input (SISO) communication, even if the receiver includes multiple antennas that are used as diversity antennas (i.e., selecting one of them to receive the incoming RF signals). For SISO wireless communications, a transceiver includes one transmitter and one receiver. Currently, most wireless local area networks (WLAN) that are IEEE 802.11, 802.11a, 802,11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennas and two or more receiver paths. Each of the antennas receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennas to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

To further improve wireless communications, transceivers may incorporate beamforming. In general, beamforming is a processing technique to create a focused antenna beam by shifting a signal in time or in phase to provide gain of the signal in a desired direction and to attenuate the signal in other directions. Prior art papers (1) Digital beamforming basics (antennas) by Steyskal, Hans, Journal of Electronic Defense, Jul. 1, 1996; (2) Utilizing Digital Down converters for Efficient Digital Beamforming, by Clint Schreiner, Red River Engineering, no publication date; and (3) Interpolation Based Transmit Beamforming for MIMO-OFMD with Partial Feedback, by Jihoon Choi and Robert W. Heath, University of Texas, Department of Electrical and Computer Engineering, Wireless Networking and Communications Group, Sep. 13, 2003 discuss beamforming concepts.

In order for a transmitter to properly implement beamforming (i.e., determine the beamforming matrix [V]), it needs to know properties of the channel over which the wireless communication is conveyed. Accordingly, the receiver must provide feedback information for the transmitter to determine the properties of the channel. One approach for sending feedback from the receiver to the transmitter is for the receiver to determine the channel response (H) and to provide it as the feedback information. An issue with this approach is the size of the feedback packet, which may be so large that, during the time it takes to send it to the transmitter, the response of the channel has changed.

To reduce the size of the feedback, the receiver may decompose the channel using singular value decomposition (SVD) and send information relating only to a calculated value of the transmitter's beamforming matrix (V) as the feedback information. In this approach, the receiver calculates (V) based on H=UDV*, where H is the channel response, D is a diagonal matrix, and U is a receiver unitary matrix. While this approach reduces the size of the feedback information, its size is still an issue for a MIMO wireless communication. For instance, in a 2×2 MIMO wireless communication, the feedback needs four elements that are all complex Cartesian coordinate values [V11 V12; V21 V22]. In general, Vik=aik+j*bik, where aik and bik are values between [−1, 1]. Thus, with 1 bit express per each element for each of the real and imaginary components, aik and bik can be either −½ or ½, which requires 4×2×1=8 bits per tone. With 4 bit expressions per each element of V(f) in an orthogonal frequency division multiplexing (OFDM) 2×2 MIMO wireless communication, the number of bits required is 1728 per tone (e.g., 4*2*54*4=1728, 4 elements per tone, 2 bits for real and imaginary components per tone, 54 data tones per frame, and 4 bits per element), which requires overhead for a packet exchange that is too large for practical applications.

Therefore, a need exists for a method and apparatus for reducing beamforming feedback information for wireless communications.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
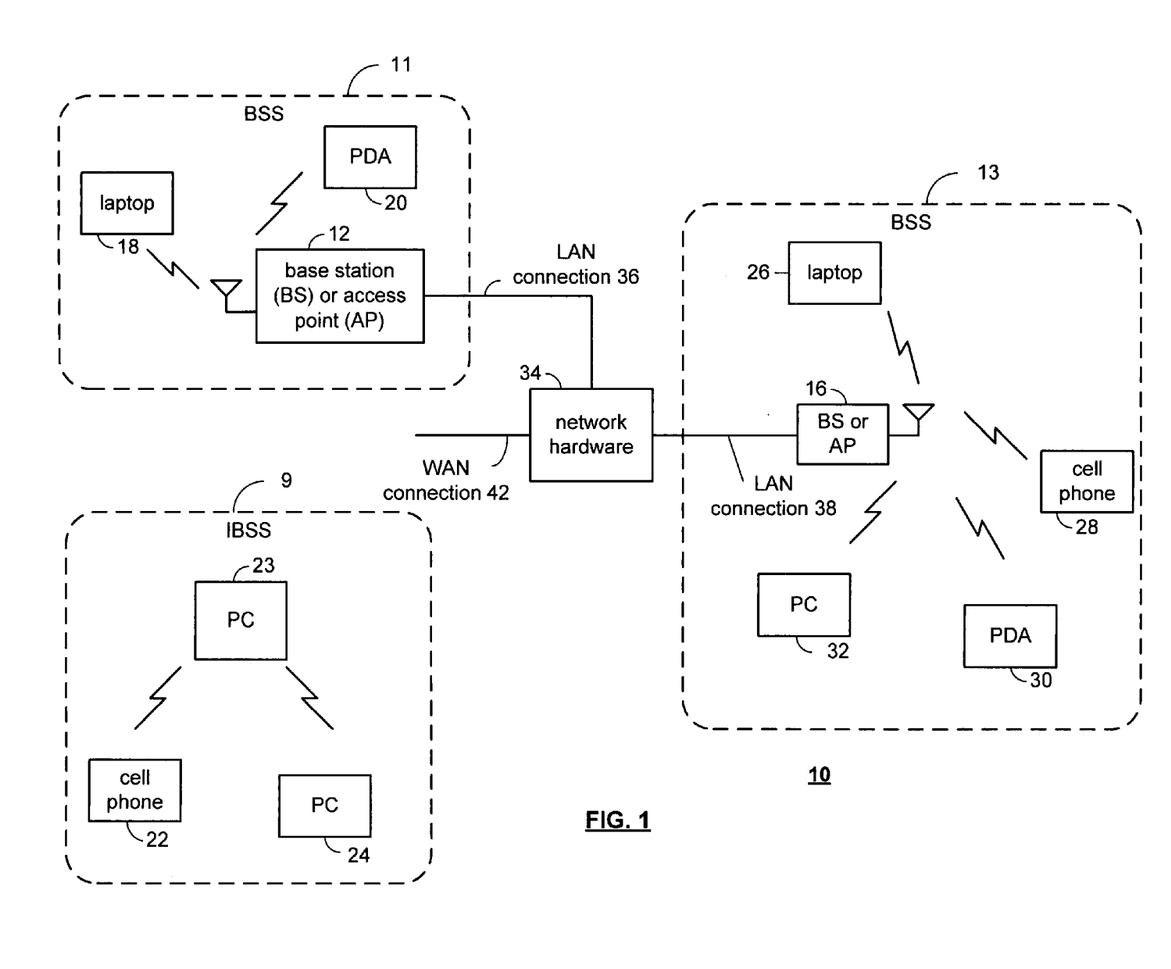
FIG. 1 is a schematic block diagram of a wireless communication system in accordance with the present invention.

FIG. 1 is a schematic block diagram illustrating a communication system 10 that includes a plurality of base stations and/or access points 12, 16, a plurality of wireless communication devices 18-32 and a network hardware component 34. Note that the network hardware 34, which may be a router, switch, bridge, modem, system controller, et cetera provides a wide area network connection 42 for the communication system 10. Further note that the wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the system 10 or to communicate outside of the system 10, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12, 16 with connectivity to other devices within the system 10 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 10.

Typically, base stations are used for cellular telephone systems and like-type systems, while access points are used for in-home or in-building wireless networks (e.g., IEEE 802.11 and versions thereof, Bluetooth, and/or any other type of radio frequency based network protocol). Regardless of the particular type of communication system, each wireless communication device includes a built-in radio and/or is coupled to a radio.

Figure 2:
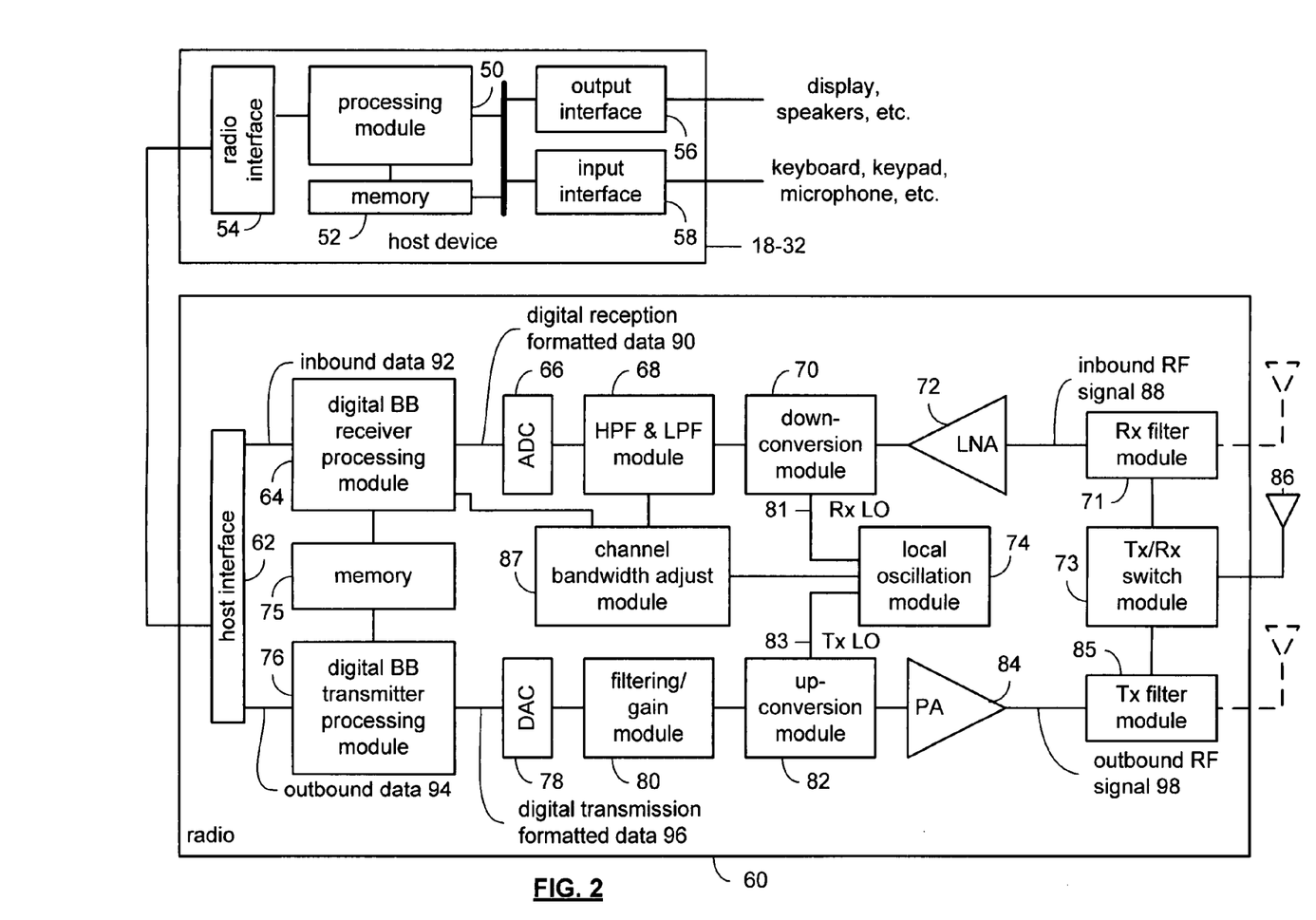
FIG. 2 is a schematic block diagram illustrating an embodiment of a wireless communication device in accordance with the present invention.

FIG. 2 is a schematic block diagram illustrating an embodiment of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, a radio interface 54, an input interface 58, and an output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a high pass and low pass filter module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter 78, a filtering/gain module 80, an IF mixing up conversion stage 82, a power amplifier 84, a transmitter filter module 85, a channel bandwidth adjust module 87, and an antenna 86. The antenna 86 may be a single antenna that is shared by transmit and receive paths as regulated by the TxRx switch 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, descrambling, and/or decoding. The digital transmitter functions include, but are not limited to, encoding, scrambling, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11, Bluetooth, et cetera) to produce digital transmission formatted data 96. The digital transmission formatted data 96 will be digital base-band signals (e.g., have a zero IF) or a digital low IF signals, where the low IF typically will be in the frequency range of one hundred kilohertz to a few megahertz.

The digital-to-analog converter 78 converts the digital transmission formatted data 96 from the digital domain to the analog domain. The filtering/gain module 80 filters and/or adjusts the gain of the analog signals prior to providing it to the IF mixing stage 82. The IF mixing stage 82 converts the analog baseband or low IF signals into RF signals based on a transmitter local oscillation 83 provided by local oscillation module 74. The power amplifier 84 amplifies the RF signals to produce outbound RF signals 98, which are filtered by the transmitter filter module 85. The antenna 86 transmits the outbound RF signals 98 to a targeted device such as a base station, an access point and/or another wireless communication device.

The radio 60 also receives inbound RF signals 88 via the antenna 86, which were transmitted by a base station, an access point, or another wireless communication device. The antenna 86 provides the inbound RF signals 88 to the receiver filter module 71 via the TxRx switch 73, where the Rx filter 71 bandpass filters the inbound RF signals 88. The Rx filter 71 provides the filtered RF signals to low noise amplifier 72, which amplifies the signals 88 to produce an amplified inbound RF signals. The low noise amplifier 72 provides the amplified inbound RF signals to the IF mixing module 70, which directly converts the amplified inbound RF signals into an inbound low IF signals or baseband signals based on a receiver local oscillation 81 provided by local oscillation module 74. The down conversion module 70 provides the inbound low IF signals or baseband signals to the filtering/gain module 68. The high pass and low pass filter module 68 filters, based on settings provided by the channel bandwidth adjust module 87, the inbound low IF signals or the digital reception formatted data to produce filtered inbound signals.

The analog-to-digital converter 66 converts the filtered inbound signals from the analog domain to the digital domain to produce digital reception formatted data 90, where the digital reception formatted data 90 will be digital base-band signals or digital low IF signals, where the low IF typically will be in the frequency range of one hundred kilohertz to a few megahertz. The digital receiver processing module 64, based on settings provided by the channel bandwidth adjust module 87, decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
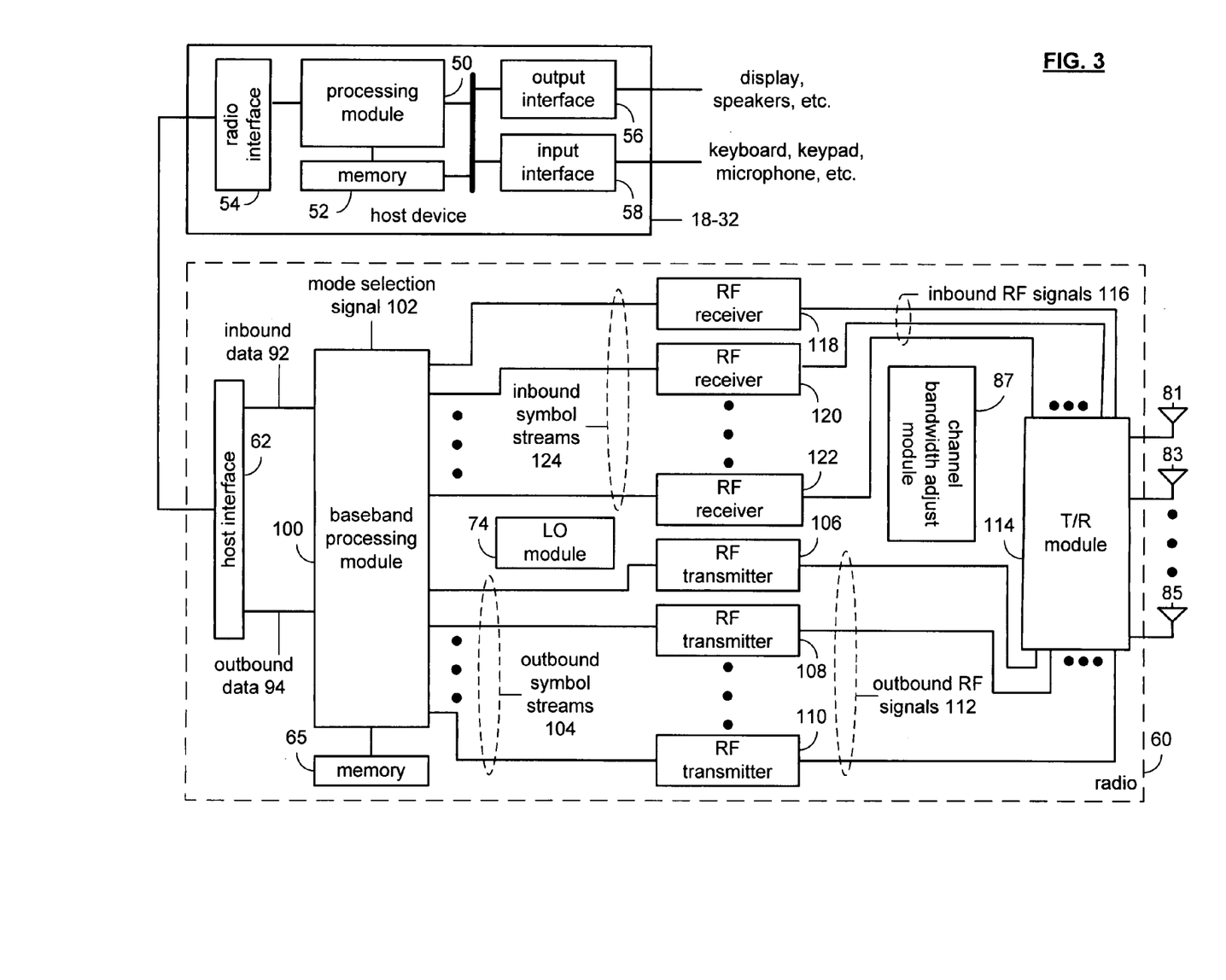
FIG. 3 is a schematic block diagram illustrating another embodiment of another wireless communication device in accordance with the present invention.

FIG. 3 is a schematic block diagram illustrating another embodiment of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 100, memory 65, a plurality of radio frequency (RF) transmitters 106-110, a transmit/receive (T/R) module 114, a plurality of antennas 81-85, a plurality of RF receivers 118-120, a channel bandwidth adjust module 87, and a local oscillation module 74. The baseband processing module 100, in combination with operational instructions stored in memory 65, executes digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, encoding, scrambling, interleaving, constellation mapping, modulation, inverse fast Fourier transform, cyclic prefix addition, space and time encoding, and digital baseband to IF conversion. The baseband processing modules 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 64 receives the outbound data 94 and, based on a mode selection signal 102, produces one or more outbound symbol streams 104. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. The mode select signal 102 may also include a code rate, a number of coded bits per subcarrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode select signal 102 may further indicate a power spectral density mask value and a number of antennas to be initially used for a MIMO communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode select signal 102 indicates 2, 3 or 4 antennas, the baseband processing module 100 will produce 2, 3 or 4 outbound symbol streams 104 from the outbound data 94.

Depending on the number of outbound streams 104 produced by the baseband module 10, a corresponding number of the RF transmitters 106-110 will be enabled to up convert the outbound symbol streams 104 into outbound RF signals 112. In general, each of the RF transmitters 106-110 includes a digital filter and upsampling module, a digital to analog conversion module, an analog filter module, a frequency up conversion module, a power amplifier, and a radio frequency bandpass filter. The RF transmitters 106-110 provide the outbound RF signals 112 to the transmit/receive module 114, which provides each outbound RF signal to a corresponding antenna 81-85.

When the radio 60 is in the receive mode, the transmit/receive module 114 receives one or more inbound RF signals 116 via the antennas 81-85 and provides them to one or more RF receivers 118-122. The RF receiver 118-122, based on settings provided by the channel bandwidth adjust module 87, down converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of average skill in the art will appreciate, the wireless communication device of FIG. 3 may be implemented using one or more integrated circuits. For example, the host device may be implemented on one integrated circuit, the baseband processing module 100 and memory 65 may be implemented on a second integrated circuit, and the remaining components of the radio 60, less the antennas 81-85, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

Figure 4:
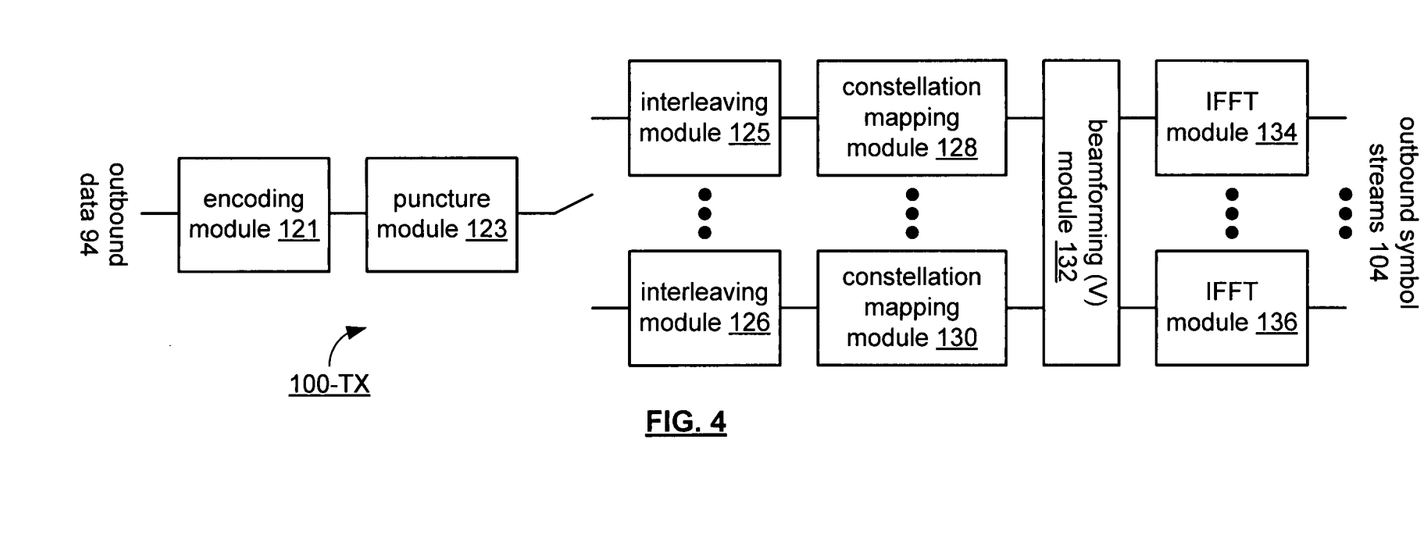
FIG. 4 is a schematic block diagram of baseband transmit processing in accordance with the present invention.

FIG. 4 is a schematic block diagram of baseband transmit processing 100-TX within the baseband processing module 100, which includes an encoding module 121, a puncture module 123, a switch, a plurality of interleaving modules 125, 126, a plurality of constellation encoding modules 128, 130, a beamforming module (V) 132, and a plurality of inverse fast Fourier transform (IFFT) modules 134, 136 for converting the outbound data 94 into the outbound symbol stream(s) 104. As one of ordinary skill in the art will appreciate, the baseband transmit processing may include two or more of each of the interleaving modules 125, 126, the constellation mapping modules 128, 130, and the IFFT modules 134, 136. In addition, one of ordinary skill in art will further appreciate that the encoding module 121, puncture module 123, the interleaving modules 124, 126, the constellation mapping modules 128, 130, and the IFFT modules 134, 136 may function in accordance with one or more wireless communication standards including, but not limited to, IEEE 802.11a, b, g, n.

In one embodiment, the encoding module 121 is operably coupled to convert outbound data 94 into encoded data in accordance with one or more wireless communication standards. The puncture module 123 punctures the encoded data to produce punctured encoded data. The plurality of interleaving modules 125, 126 is operably coupled to interleave the punctured encoded data into a plurality of interleaved streams of data. The plurality of constellation mapping modules 128, 130 is operably coupled to map the plurality of interleaved streams of data into a plurality of streams of data symbols. The beamforming module 132 is operably coupled to beamform, using a unitary matrix having polar coordinates, the plurality of streams of data symbols into a plurality of streams of beamformed symbols. The plurality of IFFT modules 134, 136 is operably coupled to convert the plurality of streams of beamformed symbols into a plurality of outbound symbol streams.

The beamforming module 132 is operably coupled to multiply a beamforming unitary matrix (V) with baseband signals provided by the plurality of constellation mapping modules 128, 130. The beamforming module 132 determines the beamforming unitary matrix V from feedback information from the receiver, wherein the feedback information includes a calculated expression of the beamforming matrix V having polar coordinates. The beamforming module 132 generates the beamforming unitary matrix V to satisfy the conditions of "V*V=VV*=I", where "I" is an identity matrix of [1 0; 0 1] for 2×2 MIMO wireless communication, is [1 0 0; 0 1 0; 0 0 1] for 3×3 MIMO wireless communication, or is [1 0 0 0; 0 1 0 0; 0 0 1 0; 0 0 0 1] for 4×4 MIMO wireless communication. In this equation, V*V means "conjugate (V) times V" and VV* means "V times conjugate (V)". Note that V may be a 2×2 unitary matrix for a 2×2 MIMO wireless communication, a 3×3 unitary matrix for a 3×3 MIMO wireless communication, and a 4×4 unitary matrix for a 4×4 MIMO wireless communication. Further note that for each column of V, a first row of polar coordinates including real values as references and a second row of polar coordinates including phase shift values.

In one embodiment, the constellation mapping modules 128, 130 function in accordance with one of the IEEE 802.11x standards to provide an OFDM (Orthogonal Frequency Domain Multiplexing) frequency domain baseband signals that includes a plurality of tones, or subcarriers, for carrying data. Each of the data carrying tones represents a symbol mapped to a point on a modulation dependent constellation map. For instance, a 16 QAM (Quadrature Amplitude Modulation) includes 16 constellation points, each corresponding to a different symbol. For an OFDM signal, the beamforming module 132 may regenerate the beamforming unitary matrix V for each tone from each constellation mapping module 128, 130, use the same beamforming unitary matrix for each tone from each constellation mapping module 128, 130, or a combination thereof.

The beamforming unitary matrix varies depending on the number of transmit paths (i.e., transmit antennas–M) and the number of receive paths (i.e., receiver antennas–N) for an M×N MIMO communication. For instance, for a 2×2 MIMO communication, the beamforming unitary matrix may be:

$$V = (V)ij = \begin{bmatrix} \cos\psi_1 & \cos\psi_2 \\ \sin\psi_1 e^{j\phi_1} & \sin\psi_2 e^{j\phi_2} \end{bmatrix}$$

In order to satisfy V*V=I, it needs to satisfy followings.

$$\cos\psi_1 \cos\psi_2 + \sin\psi_1 \sin\psi_2 e^{j(\phi_1-\phi_2)} = 0$$

$$\cos\psi_1 \cos\psi_2 + \sin\psi_1 \sin\psi_2 e^{j(\phi_2-100_2)} = 0$$

Where i, j=1, 2; $\psi_1$, $\Phi_1$, $\psi_2$, and $\Phi_2$ represent angles of the unit circle, wherein absolute value of $\psi_1-\psi_2=\pi/2$ and $\Phi_1=\Phi_2$ or $\Phi_1=\Phi_2+\pi$ and $\psi_1+\psi_2=\pi/2$.

Therefore, with $\Phi_1$ and $\psi_1$, the beamforming module 132 may regenerate V per each tone. For example, With 4-bits expression for angle $\Phi_1$ and 3-bits for angle $\psi_1$, and 1-bit for the index for #1 or #2 in 54 tones, (i.e., 8-bits per tone) total feedback information may be 8×54/8=54 bytes. ($\psi$ in [0, $\pi$] $\Phi$ in [$-\pi\pi$]).

For a 3×3 MIMO communication, the beamforming unitary matrix may be:

$$V = (V)ij = \begin{bmatrix} \cos\psi_1 & \cos\psi_2 & \cos\psi_3 \\ \sin\psi_1\cos\theta_1 e^{j\phi_{21}} & \sin\psi_2\cos\theta_2 e^{j\phi_{22}} & \sin\psi_3\cos\theta_3 e^{j\phi_{23}} \\ \sin\psi_1\sin\theta_1 e^{j\phi_{31}} & \sin\psi_2\sin\theta_2 e^{j\phi_{32}} & \sin\psi_3\sin\theta_3 e^{j\phi_{33}} \end{bmatrix}$$

where i, j=1, 2, 3; $\psi_1, \psi_2, \psi_3, \theta_1, \theta_2, \theta_3, \Phi_{21}, \Phi_{22}, \Phi_{23}, \Phi_{32}, \Phi_{33}$ represent angles of the unit circle, wherein Diagonal (V*V)=1s, and wherein:

$$\psi_i = \cos^{-1} V_{1i}, \; \theta_i = \cos^{-1}\left|\frac{V_{2i}}{\sin\psi_i}\right|$$

$$\phi_{2i} = \angle(V_{2i}), \; \phi_{3i} = \angle(V_{3i})$$

In this example, with 12 angles, the beamforming module 132 may regenerate V as a 3×3 matrix per tone. With 4-bits for expression for the angles, a 54 tone signal may have feedback information of 324 bytes (e.g., 4×12×54/8).

For a 4×4 MIMO communication, the beamforming unitary matrix may be:

$$V = (V)ij = \begin{bmatrix} \cos\psi_1\cos\varphi_1 & \cos\psi_2\cos\varphi_2 & \cos\psi_3\cos\varphi_3 & \cos\psi_4\cos\varphi_4 \\ \cos\psi_1\sin\varphi_1 e^{j\phi_{11}} & \cos\psi_2\sin\varphi_2 e^{j\phi_{12}} & \cos\psi_3\sin\varphi_3 e^{j\phi_{13}} & \cos\psi_4\sin\varphi_4 e^{j\phi_{14}} \\ \sin\psi_1\cos\theta_1 e^{j\phi_{21}} & \sin\psi_2\cos\theta_2 e^{j\phi_{22}} & \sin\psi_3\cos\theta_3 e^{j\phi_{23}} & \sin\psi_4\cos\theta_4 e^{j\phi_{24}} \\ \sin\psi_1\sin\theta_1 e^{j\phi_{31}} & \sin\psi_2\sin\theta_2 e^{j\phi_{32}} & \sin\psi_3\sin\theta_3 e^{j\phi_{33}} & \sin\psi_4\sin\theta_4 e^{j\phi_{34}} \end{bmatrix} =$$

$[\cos(\psi_1)\cos(\Phi_2); \sin(\psi_1)*e^{j\Phi_1} \sin(\psi_2)*e^{j\Phi_2}]$, where i,j=1, 2, 3, 4; wherein $\psi_1, \psi_2, \psi_3, \psi_4, \theta_1, \theta_2, \theta_3, \theta_4, \phi_1, \phi_2, \phi_3, \phi_4, \Phi_{21}, \Phi_{22}, \Phi_{23}, \Phi_{24}, \Phi_{31}, \Phi_{32}, \Phi_{33}, \Phi_{33}, \Phi_{41}, \Phi_{42}, \Phi_{43}, \Phi_{43}$ represent angles of the unit circle, wherein Diagonal (V*V)=1s, and wherein:

$$\psi_i = \cos^{-1}\left(\sqrt{|V_{1i}|^2 + |V_{2i}|^2}\right),$$

$$\varphi_i = \cos^{-1}\left(\frac{V_{1i}}{\cos\psi_i}\right),$$

$$\theta_i = \cos^{-1}\left|\frac{V_{3i}}{\sin\psi_i}\right|$$

$$\phi_{1i} = \angle(V_{2i}),$$

$$\phi_{2i} = \angle(V_{3i}),$$

$$\phi_{3i} = \angle(V_{4i})$$

In this example, with 24 angles, the beamforming module 132 may regenerate V as a 4×4 matrix per tone. With 4-bits for expression for the angles, a 54 tone signal may have feedback information of 648 bytes (e.g., 4×24×54/8).

The baseband transmit processing 100-TX receives the polar coordinates Φ andψ V from the receiver as feedback information as will described in greater detail with reference to FIG. 6.

Figure 5:
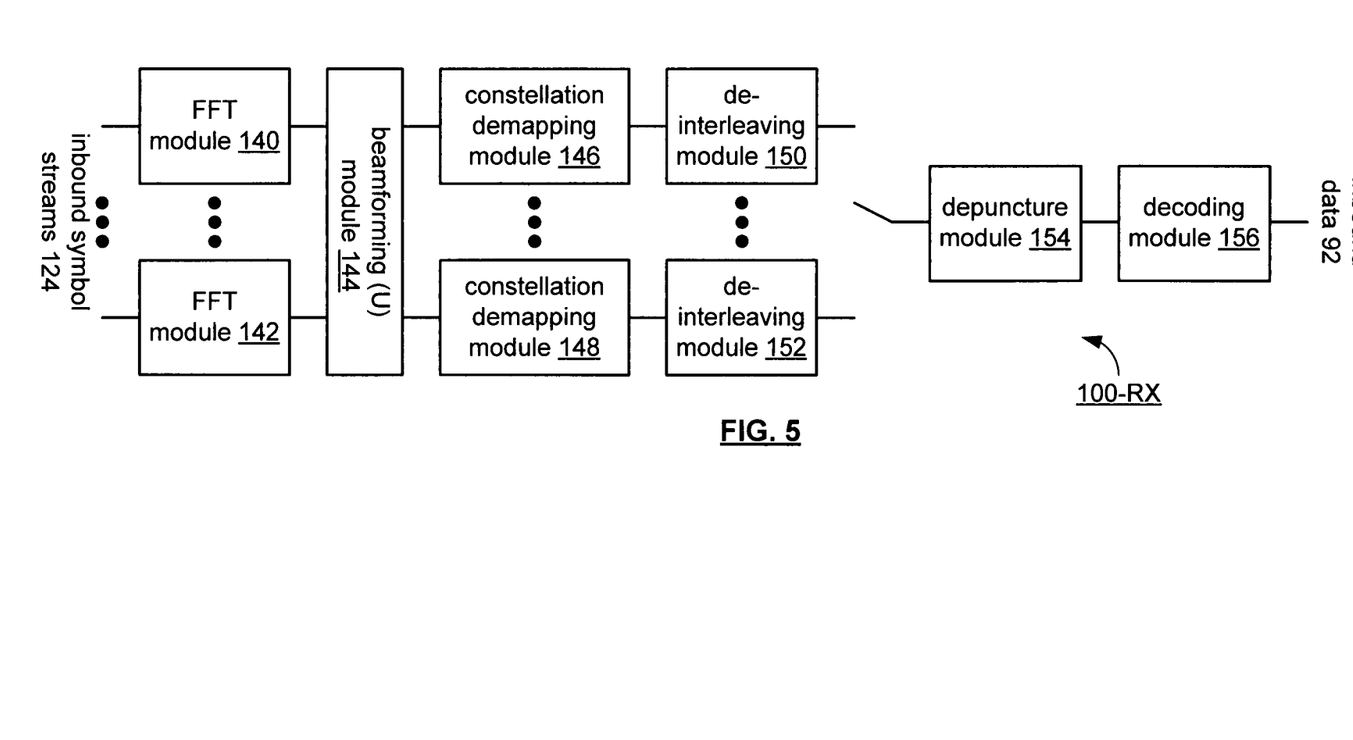
FIG. 5 is a schematic block diagram of baseband receive processing in accordance with the present invention.

FIG. 5 is a schematic block diagram of baseband receive processing 100-RX that includes a plurality of fast Fourier transform (FFT) modules 140, 142, a beamforming (U) module 144, a plurality of constellation demapping modules 146, 148, a plurality of deinterleaving modules 150, 152, a switch, a depuncture module 154, and a decoding module 156 for converting a plurality of inbound symbol streams 124 into inbound data 92. As one of ordinary skill in the art will appreciate, the baseband receive processing 100-RX may include two or more of each of the deinterleaving modules 150, 152, the constellation demapping modules 146, 148, and the FFT modules 140, 142. In addition, one of ordinary skill in art will further appreciate that the decoding module 156, depuncture module 154, the deinterleaving modules 150, 152, the constellation decoding modules 146, 148, and the FFT modules 140, 142 may be function in accordance with one or more wireless communication standards including, but not limited to, IEEE 802.11a, b, g, n.

In one embodiment, a plurality of FFT modules 140, 142 is operably coupled to convert a plurality of inbound symbol streams 124 into a plurality of streams of beamformed symbols. The inverse beamforming module 144 is operably coupled to inverse beamform, using a unitary matrix having polar coordinates, the plurality of streams of beamformed symbols into a plurality of streams of data symbols. The plurality of constellation demapping modules is operably coupled to demap the plurality of streams of data symbols into a plurality of interleaved streams of data. The plurality of deinterleaving modules is operably coupled to deinterleave the plurality of interleaved streams of data into encoded data.

The decoding module is operably coupled to convert the encoded data into inbound data 92.

The beamforming module 144 is operably coupled to multiply a beamforming unitary matrix (U) with baseband signals provided by the plurality of FFT modules 140, 142. The FFT modules 140, 142 function in accordance with one of the IEEE 802.11x standards to provide an OFDM (Orthogonal Frequency Domain Multiplexing) frequency domain baseband signals that includes a plurality of tones, or subcarriers, for carrying data. Each of the data carrying tones represents a symbol mapped to a point on a modulation dependent constellation map. The baseband receive processing 100-RX is further functional to produce feedback information for the transmitter as further described with reference to FIG. 6.

Figure 6:
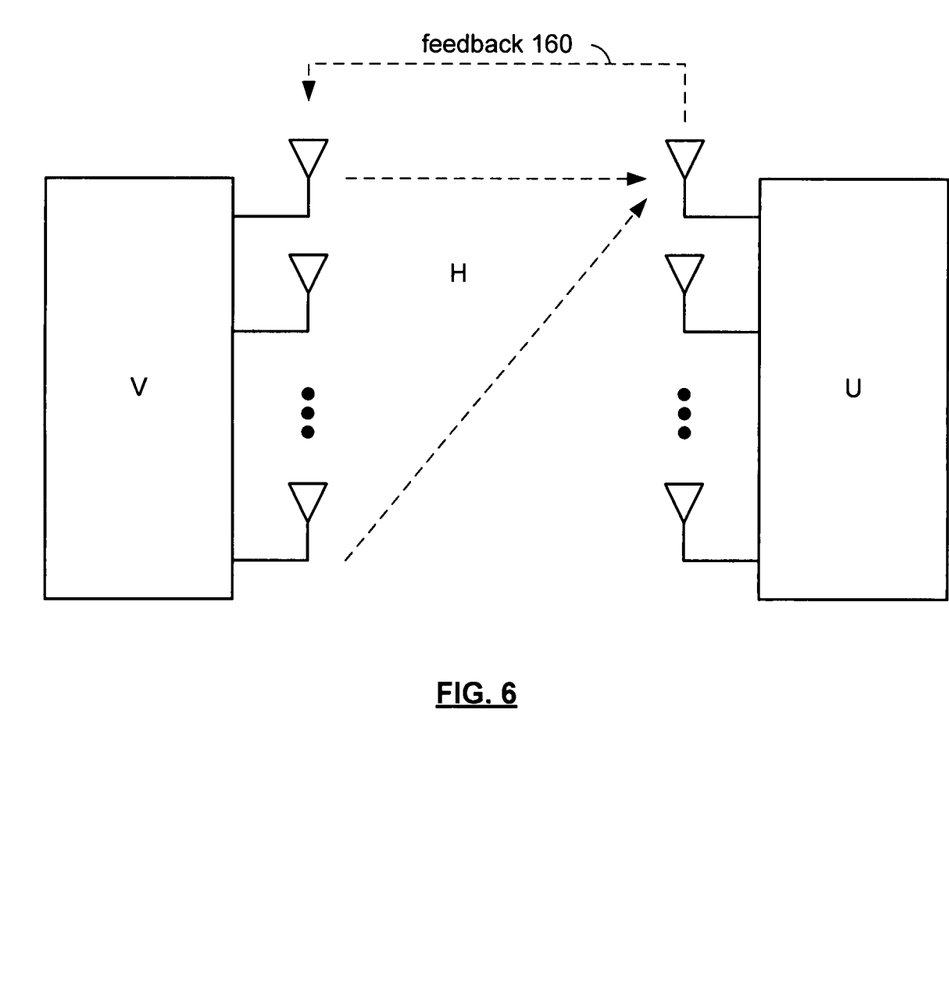
FIG. 6 is a schematic block diagram of a beamforming wireless communication in accordance with the present invention.

FIG. 6 is a schematic block diagram of a beamforming wireless communication where H=UDV* (H—represents the channel, U is the receiver beamforming unitary matrix, and V* is the conjugate of the transmitter beamforming unitary matrix. With H=UDV*, y (the received signal)=Hx+N, where x represents the transmitted signals and N represents noise. If z=Vx, then U*y=U*UDV*Vz+U*n=Dz+N.

From this expression, the baseband receive processing 100-RX may readily determine the feedback of V, where V includes polar coordinates. For instance, the receiver may decompose the channel using singular value decomposition (SVD) and send information relating only to a calculated value of the transmitter's beamforming matrix (V) as the feedback information. In this approach, the receiver calculates (V) based on H=UDV*, where H is the channel response, D is a diagonal matrix, and U is a receiver unitary matrix. This approach reduces the size of the feedback information with respect to SVD using Cartesian coordinates. For example, in a 2×2 MIMO wireless communication, the feedback needs four elements that are all complex values [V11 V12; V21 V22] with two angles (ψ and Φ). In general, Vik=aik+j*bik, where aik and bik are values between [−1, 1]. To cover [−1, 1], ψ is in [0, π] and Φ is in [0, 2π]. With π/2 resolutions for angles, ψ needs to be π/4 or 3π/4, i.e., cos(ψ)= 0.707 or −0.707, which requires 1 bit, where Φ needs to be either π/4, 3π/4, 5π/4, 7π/4, i.e., exp(j Φ)=0.707(1+j), 0.707 (1−j), 0.707(−1+j) or 0.707(−1−j), which requires 2 bits. With π/4 resolutions for angles, ψ needs to be π/8, 3π/8, 5π/8, or 7π/8, which requires 2 bits, where Φ needs to be either π/8, 3π/8, 5π8, 7π/8, 9π8, 11π/8, 13π/8 or 15π/8, which requires 4 bits. So, for an example of 2×2 system to use 4 bits per tone, it may have 1 bit for ψ, 2 bits for 4) and 1 index bit to determine the relationship between ψ and Φ, such as either ψ1=ψ2+π and Φ1+Φ2=π/2, or ψ1=ψ2 and Φ1−Φ2=π/2.

For the same resolution in Cartesian expression of 4 bits per each element for each of the real and imaginary components, aik and bik, can be within [−½, ½], it requires 4*2*4=32 bits per tone. For OFDM MIMO wireless communications, the number of bits required is 1728 bits for the Cartesian expression. While an angle expression in accordance with the present invention requires 8 bits per tone, which for the same OFDM MIMO wireless communications would require 432 bits. This represents a significant reduction in the overhead needed for packet exchange.

Figure 7:
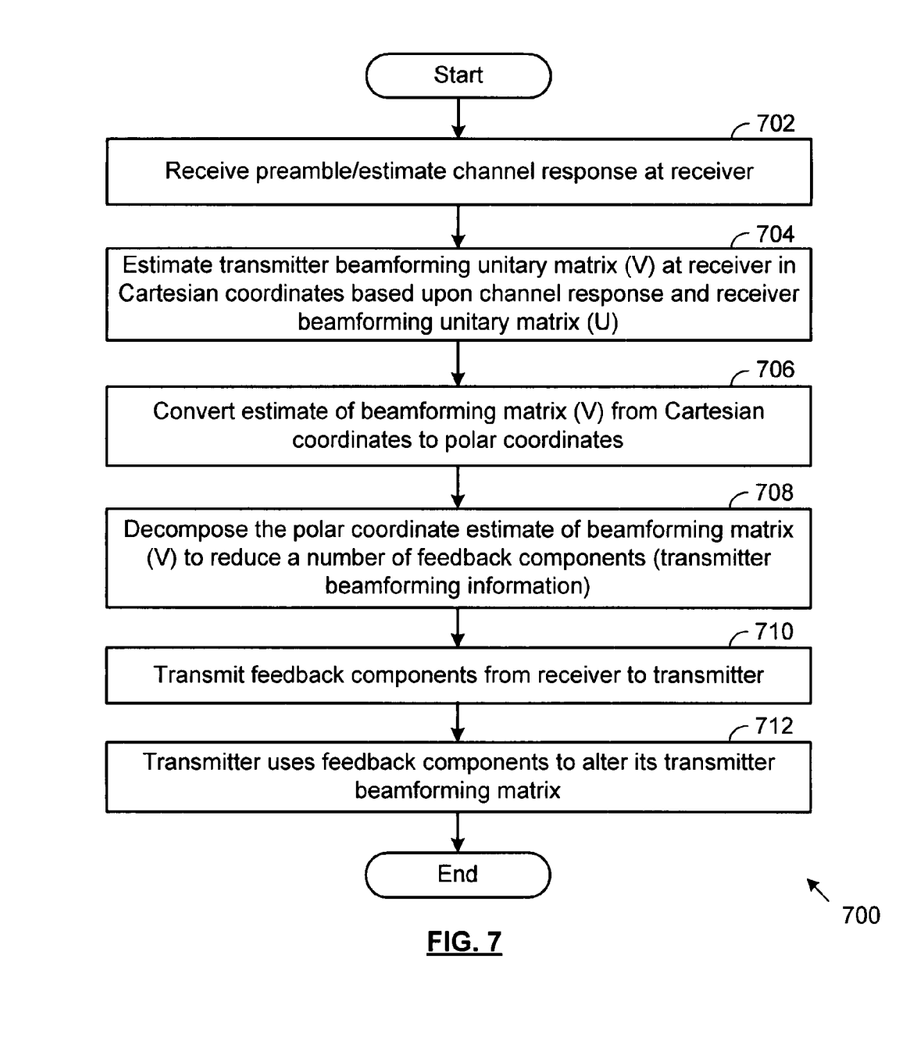
FIG. 7 is a flow chart illustrating another embodiment of the present invention for providing beamforming feedback information from a receiver to a transmitter.

FIG. 7 is a flow chart illustrating another embodiment of the present invention for providing beamforming feedback information from a receiver to a transmitter. The method 700 in particular addresses the feed back of observed transmitter beamforming information from a receiving wireless communication device to a transmitting wireless communication device. The method 700 of FIG. 7 relates to MIMO wireless communication systems, among others. Most of the operations 700 of FIG. 7 are typically performed by a baseband processing module, e.g., 100 of FIG. 3 of a receiving wireless device.

The method 700 commences with the receiving wireless communication device receiving a preamble sequence from the transmitting wireless device and estimating a channel response from the preamble sequence (step 702). Estimating the channel response includes comparing received training symbols of the preamble to corresponding expected training symbols using any of a number of techniques that are known in the art. The receiving wireless device then determines an estimated transmitter beamforming unitary matrix (V) based upon the channel response and a known receiver beamforming unitary matrix (U) (step 704). The channel response (H), estimated transmitter beamforming unitary matrix (V), and the known receiver beamforming unitary matrix (U) are related by the equation H=UDV*, where, D is a diagonal matrix. Singular Value Decomposition (SVD) operations may be employed to produce the estimated transmitter beamforming unitary matrix (V) according to this equation.

According to the embodiment of FIG. 7, the receiving wireless device produces the estimated transmitter beamforming unitary matrix (V) in Cartesian coordinates and then converts the estimated transmitter beamforming unitary matrix (V) to polar coordinates (step 706). With the estimated transmitter beamforming unitary matrix (V) determined, the receiving wireless device then decomposes the estimated transmitter beamforming unitary matrix (V) to produce the transmitter beamforming information (step 708).

According to one embodiment of this operation, the decomposition operations of step 708 employ a Givens Rotation operation. The Givens Rotation relies upon the observation that, with the condition of V*V=VV*=I, some of angles of the Givens Rotation are redundant. With a decomposed matrix form for the estimated transmitter beamforming matrix (V), the set of angles fed back to the transmitting wireless device are reduced.

Operation continues with the receiving wireless device wirelessly sending the transmitter beamforming information to the transmitting wireless device (step 710). This operation occurs with the receiving wireless device shifting to a transmit mode and sending the information back to the transmitting wireless device. The transmitting wireless device then uses the feedback components to generate a new beamforming matrix (V), which it uses for subsequent transmissions (step 712).

Figure 8:
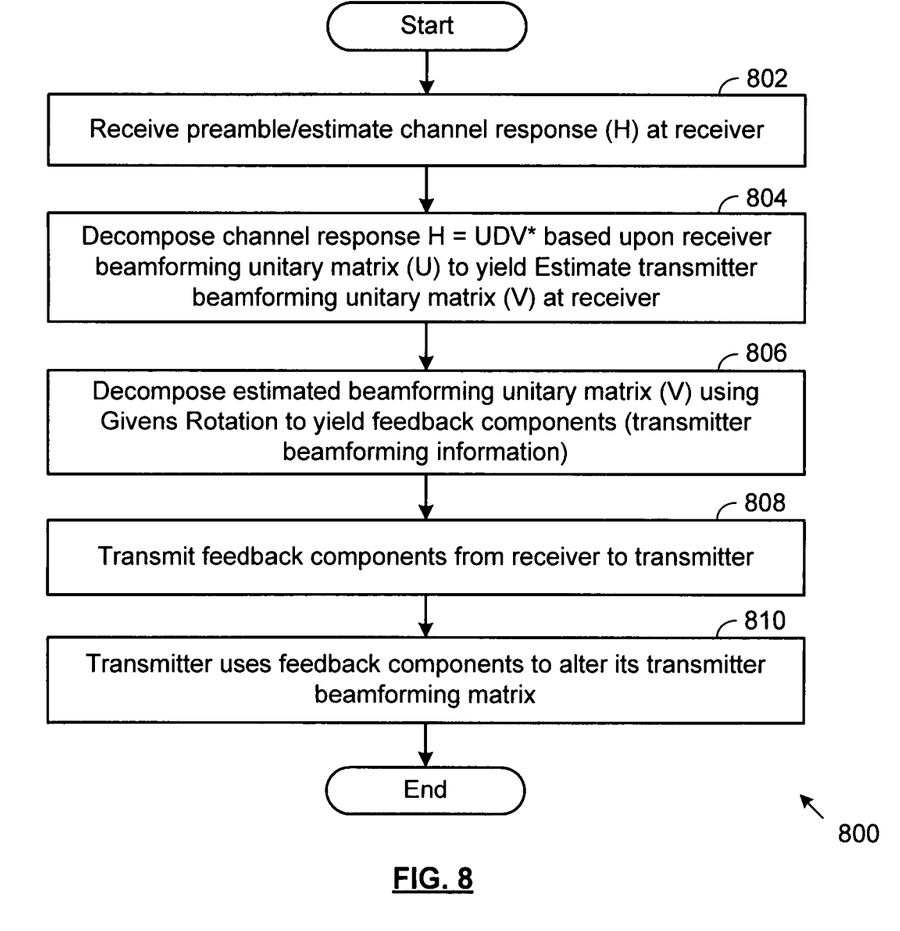
FIG. 8 is a flow chart illustrating another embodiment of the present invention for providing beamforming feedback information from a receiver to a transmitter

FIG. 8 is a flow chart illustrating another embodiment of the present invention for providing beamforming feedback information from a receiver to a transmitter. The operations 800 of FIG. 8 are similar to the operations 700 of FIG. 7 and would typically be performed by a baseband processing module, e.g., 100 of FIG. 3 of a receiving wireless device.

The method 800 commences with the receiving wireless communication device receiving a preamble sequence from the transmitting wireless device and estimating a channel response (H) from the preamble sequence (step 802). Techniques similar/same as those described with reference to step 702 of FIG. 7 may be employed.

The receiving wireless device then decomposes the channel response (H) based upon the receiver beamforming unitary matrix (U) to produce an estimated transmitter beamforming unitary matrix (V) (step 804). With the estimated transmitter beamforming unitary matrix (V) determined, the receiving wireless device then decomposes the estimated transmitter beamforming unitary matrix (V) using a Givens Rotation to produce the transmitter beamforming information (step 806). The products of this Givens Rotation are the transmitter beamforming information.

Operation continues with the receiving wireless device wirelessly sending the transmitter beamforming information to the transmitting wireless device (step 808). This operation occurs with the receiving wireless device shifting to a transmit mode and sending the transmitter beamforming information to the transmitting wireless device. The transmitting wireless device then uses the feedback components to generate a new beamforming matrix (V), which it uses for subsequent transmissions (step 810).

One example of a Givens Rotation matrix that may be used for the decomposition operations of step 806 (and step 708) is:

$$G_l(\psi) = \begin{bmatrix} I_{l-1} & 0 & 0 & 0 \\ 0 & \cos\psi & \sin\psi & 0 \\ 0 & -\sin\psi & \cos\psi & 0 \\ 0 & 0 & 0 & I_{N-l-1} \end{bmatrix}$$

With this form, the Givens Rotation matrix rotates M [I,j], [I,j] to make (i,j−1)th component zero, where M [I,j],[I,j] is 2×2 block matrix at ith, jth row and ith, jth column.

Applying the Givens Rotation to the 2×2 estimated transmitter beamforming matrix (V) described above, for a particular form of the Givens Rotation, ψ in [0, π/2], φ in [−π, π] the 2×2 estimated transmitter beamforming matrix (V) can be rewritten as:

$$V = \begin{bmatrix} \cos\psi_1 & \cos(\frac{\pi}{2} - \psi_1) \\ \sin\psi_1 e^{j(\pi+\phi_2)} & \sin(\frac{\pi}{2} - \psi_1)e^{j\phi_2} \end{bmatrix}$$

$$= \begin{bmatrix} 1 & 0 \\ 0 & e^{j\phi} \end{bmatrix} \begin{bmatrix} \cos\psi & \sin\psi \\ -\sin\psi & \cos\psi \end{bmatrix}$$

With angle resolution of $\pi/2^a$, where a=# of bits per angle, the total number of bits per tone is (a−1)+(a+1)=2a. With the 2×2 estimated transmitter beamforming matrix (V), ψ needs (a−1) bits to cover [0, π/2] and φ needs (a+1) bits to cover [−π, π]. With this notation: 'a=1' means quantized angle is either [π/4, 3π/4] to cover [0, π] angle resolution of π/2; and 'a=2' means quantized angle is either [π/8, 3π/8, 5π/8, 7π/8] to cover [0, π] with angle resolution of π/4.

By using all combinations of the Givens Rotation, these concepts may be extended to an N×M matrix. Because the Givens Rotation needs real values, a phase matrix Di is applied before the Givens Rotation to yield:

$$V = \prod_{i=1}^{M} \left[ D_i(1_{i-1} e^{j\phi_{ii}} \ldots e^{j\phi_{iN}}) \prod_{j=i}^{N-1} G_j(\psi_{i,j}) \right] \times \tilde{I}_{N\times M}$$

Where:

$D_i$ is an N×N diagonal matrix with diagonal components in arguments.

$I_{N\times M}$ is an N×M identity matrix, where $(I)_{ii}$=1 for i=1, . . . , min(M,N).

As the reader will appreciate, the coefficients of the Givens Rotation and the phase matrix coefficients serve as the transmitter beamforming information that is sent from the receiving wireless communication device to the transmitting wireless communication device. For a 3×3 estimated transmitter beamforming matrix (V), from Givens Rotation, six angles in total ($\phi_{22}$, $\phi_{23}$, $\phi_{33}$, $\psi_{12}$, $\psi_{13}$, $\psi_{23}$) are required. With angle resolution of $\pi/2^a$, where a=# of bits per angle, the total number of bits per tone is 3(a−1)+3(a+1)=6a. In such case, ψ needs (a−1) bits to cover [0, π/2] and φ needs (a+1) bits to cover [−π, π]. Using this polar coordinates embodiment, 24 bits per sub carrier are required to achieve equivalent full resolution performance to a Cartesian coordinates solution, which requires 72 bits per sub carrier.

For a 4×4 estimated transmitter beamforming matrix (V), from Givens Rotation, twelve angles in total ($\phi_{22}$, $\phi_{23}$, $\phi_{24}$, $\phi_{33}$, $\phi_{34}$, $\phi_{44}$, $\psi_{12}$, $\psi_{13}$, $\psi_{23}$, $\psi_{23}$, $\psi_{24}$, $\psi_{33}$) are required. With angle resolution of $\pi/2^a$, where a=# of bits per angle, the total number of bits per tone is 6(a−1)+6(a+1)=12a. In such case, ψ needs (a−1) bits to cover [0, π/2] and φ needs (a+1) bits to cover [−π, π]. Using this polar coordinates embodiment, 48 bits per sub carrier are required to achieve equivalent full resolution performance to a Cartesian coordinates solution, which requires 128 bits per sub carrier.

Using these techniques, for a simple case of 2×2 system with 20 MHz BW, the feedback of transmitter beamforming information requires 10*52/8=65 bytes. For the worst case of 4×4 system with 40 MHz BW (108 tones), the feedback requires 48*108/8=648 bytes. Efficiencies can be further obtained by using the correlation property of adjacent tones. (e.g., sending one information per every three tones). However, with a slowly fading channel, frequent channel feedback is not required.

The preceding discussion has presented a method and apparatus for reducing feedback information for beamforming in a wireless communication by using polar coordinates. As one of average skill in the art will appreciate, other embodiments may be derived from the present teachings without deviating from the scope of the claims.

What is claimed is:

1. A method for feeding back transmitter beamforming information from a receiving wireless communication device to a transmitting wireless communication device, the method comprising:
    the receiving wireless communication device receiving a preamble sequence from the transmitting wireless device;
    the receiving wireless device estimating a channel response based upon the preamble sequence;
    the receiving wireless device determining an estimated transmitter beamforming unitary matrix (V) based upon the channel response and a receiver beamforming unitary matrix (U);
    the receiving wireless device decomposing the estimated transmitter beamforming unitary matrix (V) to produce the transmitter beamforming information; and
    the receiving wireless device wirelessly sending the transmitter beamforming information to the transmitting wireless device.

2. The method of claim 1 wherein the receiving wireless device determining an estimated transmitter beamforming unitary matrix (V) based upon the channel response and a receiver beamforming unitary matrix (U) comprises:
    the receiving wireless device producing the estimated transmitter beamforming unitary matrix (V) in Cartesian coordinates; and
    the receiving wireless device converting the estimated transmitter beamforming unitary matrix (V) to polar coordinates.

3. The method of claim 1 wherein the channel response (H), estimated transmitter beamforming unitary matrix (V), and the receiver beamforming unitary matrix (U) are related by the equation:

$$H=UDV*$$

where, D is a diagonal matrix.

4. The method of claim 3, wherein the receiving wireless device determining an estimated transmitter beamforming unitary matrix (V) based upon the channel response and a receiver beamforming unitary matrix (U) comprises performing a Singular Value Decomposition (SVD) operation.

5. The method of claim 1, wherein the receiving wireless device decomposing the estimated transmitter beamforming unitary matrix (V) to produce the transmitter beamforming information comprises the receiving wireless device decomposing the estimated transmitter beamforming unitary matrix (V) using a QR decomposition technique.

6. The method of claim 5, wherein the QR decomposition technique comprises a Givens Rotation operation performed according to the equation:

$$V = \prod_{i=1}^{M} \left[ D_i(1_{i-1} e^{j\phi_{ii}} \ldots e^{j\phi_{iN}}) \prod_{j=i}^{N-1} G_j(\psi_{i,j}) \right] \times \tilde{I}_{N\times M}$$

Where:

$D_i$ is an N×N diagonal matrix with diagonal components in arguments;

$I_{N \times M}$ is an N×M identity matrix, where $(I)_{ii}=1$ for $i=1, \ldots, \min(M,N)$; and wherein the transmitter beamforming information includes angles corresponding to elements of the diagonal matrix D and elements of the Givens Rotation, wherein N is a number of transmit antennas, M is a number of receive antennas, and wherein i and j are each integers.

7. The method of claim 1, wherein:
the transmitting wireless device transmits on N antennas; and
the receiving wireless device receives on M antennas.

8. The method of claim 1, wherein at least one of the transmitting wireless device and the receiving wireless device supports Multiple Input Multiple Output (MIMO) operations.

9. A wireless communication device comprising:
a plurality of Radio Frequency (RF) components operable to receive an RF signal and to convert the RF signal to a baseband signal; and
a baseband processing module operable to:
receive a preamble sequence carried by the baseband signal;
estimate a channel response based upon the preamble sequence;
determine an estimated transmitter beamforming unitary matrix (V) based upon the channel response and a receiver beamforming unitary matrix (U);
decompose the estimated transmitter beamforming unitary matrix (V) to produce the transmitter beamforming information; and
form a baseband signal employed by the plurality of RF components to wirelessly send the transmitter beamforming information to the transmitting wireless device.

10. The wireless communication device of claim 9, wherein in determining an estimated transmitter beamforming unitary matrix (V) based upon the channel response and a receiver beamforming unitary matrix (U), the baseband processing module is operable to:
produce the estimated transmitter beamforming unitary matrix (V) in Cartesian coordinates; and
convert the estimated transmitter beamforming unitary matrix (V) to polar coordinates.

11. The wireless communication device of claim 9, wherein the channel response (H), estimated transmitter beamforming unitary matrix (V), and the receiver beamforming unitary matrix (U) are related by the equation:

$$H = UDV^*$$

where, D is a diagonal matrix.

12. The wireless communication device of claim 9, wherein in determining the estimated transmitter beamforming unitary matrix (V) based upon the channel response and the receiver beamforming unitary matrix (U), the baseband processing module performs Singular Value Decomposition (SVD) operations.

13. The wireless communication device of claim 9, wherein in decomposing the estimated transmitter beamforming unitary matrix (V) to produce the transmitter beamforming information, the baseband processing module decomposes the estimated transmitter beamforming unitary matrix (V) using a QR decomposition technique.

14. The wireless communication device of claim 13, wherein the QR decomposition technique comprises a Givens Rotation operation performed according to the equation:

$$V = \prod_{i=1}^{M} \left[ D_i(1_{i-1} e^{j\phi_{ii}} \ldots e^{j\phi_{iN}}) \prod_{j=i}^{N-1} G_j(\psi_{i,j}) \right] \times \tilde{I}_{N \times M}$$

Where:
$D_i$ is an N×N diagonal matrix with diagonal components in arguments;

$I_{N \times M}$ is an N×M identity matrix, where $(I)_{ii}=1$ for $i=1, \ldots, \min(M,N)$; and wherein the transmitter beamforming information includes angles corresponding to elements of the diagonal matrix D and elements of the Givens Rotation, wherein N is a number of transmit antennas, M is a number of receive antennas, and wherein i and j are each integers.

15. The wireless communication device of claim 10, wherein:
the transmitting wireless device transmits on N antennas; and
the wireless communication device includes M antennas.

16. The wireless communication device of claim 10, wherein the wireless communication device supports Multiple Input Multiple Output (MIMO) operations.

17. A method for feeding back transmitter beamforming information from a receiving wireless communication device to a transmitting wireless communication device, the method comprising:
the receiving wireless communication device receiving a preamble sequence from the transmitting wireless device;
the receiving wireless device estimating a channel response based upon the preamble sequence;
the receiving wireless device decomposing the channel response based upon the channel response and a receiver beamforming unitary matrix (U) to produce an estimated transmitter beamforming unitary matrix (V);
the receiving wireless device decomposing the estimated transmitter beamforming unitary matrix (V) to produce the transmitter beamforming information; and
the receiving wireless device wirelessly sending the transmitter beamforming information to the transmitting wireless device.

18. The method of claim 17, wherein the receiving wireless device decomposing the channel response based upon the channel response and a receiver beamforming unitary matrix (U) to produce an estimated transmitter beamforming unitary matrix (V) includes performing a Singular Value Decomposition (SVD) operation.

19. The method of claim 17, wherein the receiving wireless device decomposing the estimated transmitter beamforming unitary matrix (V) to produce the transmitter beamforming information comprises the receiving wireless device decomposing the estimated transmitter beamforming unitary matrix (V) using a Givens Rotation operation performed according to the equation:

$$V = \prod_{i=1}^{M} \left[ D_i(1_{i-1} e^{j\phi_{ii}} \ldots e^{j\phi_{iN}}) \prod_{j=i}^{N-1} G_j(\psi_{i,j}) \right] \times \tilde{I}_{N \times M}$$

Where:
$D_i$ is an N×N diagonal matrix with diagonal components in arguments;

$I_{N \times M}$ is an N×M identity matrix, where $(I)_{ii}=1$ for i=1, ..., min(M,N); and wherein the transmitter beamforming information includes angles corresponding to elements of the diagonal matrix D and elements of the Givens Rotation, wherein N is a number of transmit antennas, M is a number of receive antennas, and wherein i and j are each integers.

20. The method of claim 19, wherein the transmitter beamforming information comprises element values of the diagonal matrix D and element values of the Givens Rotation matrix.

* * * * *